H. R. STAFFORD
LOCOMOTIVE TRUCK.
APPLICATION FILED OCT. 2, 1915.

1,163,623. Patented Dec. 7, 1915.
2 SHEETS—SHEET 1.

WITNESSES
Edward A. Wright
S. R. Bell

INVENTOR
Hal R. Stafford
by Snowden Bell
atty

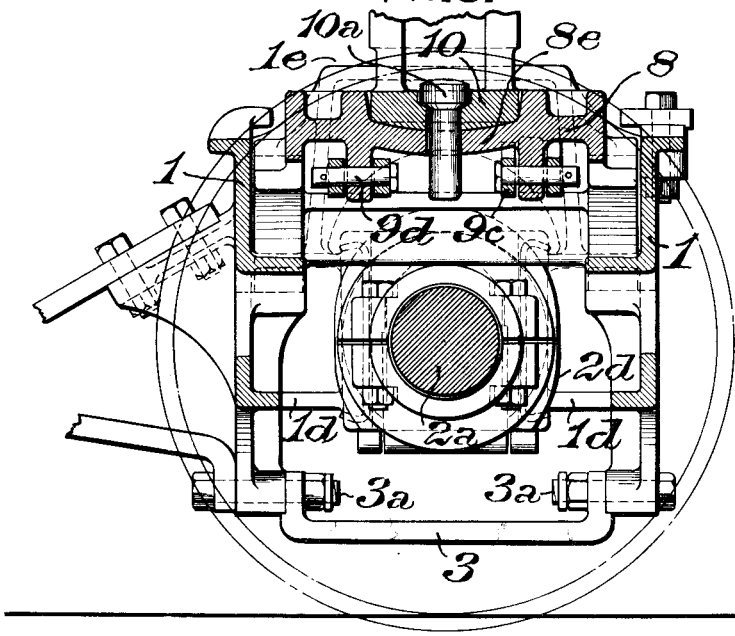
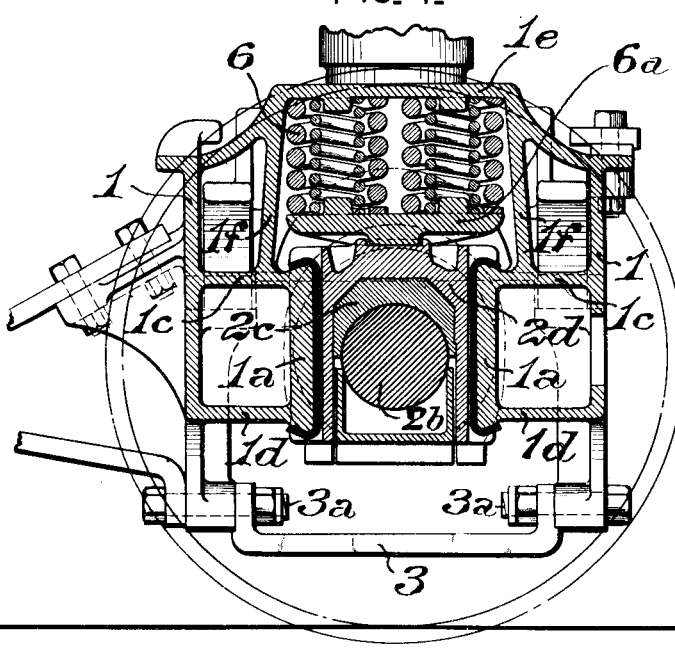

UNITED STATES PATENT OFFICE.

HAL R. STAFFORD, OF PLAINFIELD, NEW JERSEY, ASSIGNOR TO ECONOMY DEVICES CORPORATION, OF NEW YORK, N. Y., A CORPORATION OF NEW YORK.

LOCOMOTIVE-TRUCK.

1,163,623.  Specification of Letters Patent.  Patented Dec. 7, 1915.

Application filed October 2, 1915. Serial No. 53,692.

*To all whom it may concern:*

Be it known that I, HAL R. STAFFORD, of Plainfield, in the county of Union and State of New Jersey, have invented a certain new and useful Improvement in Locomotive-Trucks, of which improvement the following is a specification.

My invention relates to two wheeled leading or trailing trucks for locomotive engines, of the type known as "swing" or "lateral motion" trucks, and its object is to provide a truck of such type, the frame of which shall embody the advantages of strength, simplicity, and economy of construction; in which springs of sufficient capacity may be so located as to properly transmit load from the frame to the axle boxes; and in which the permissible degree of lateral motion or "swing" may be substantially increased as compared with prior constructions.

The improvement claimed is hereinafter fully set forth.

Figure 1:
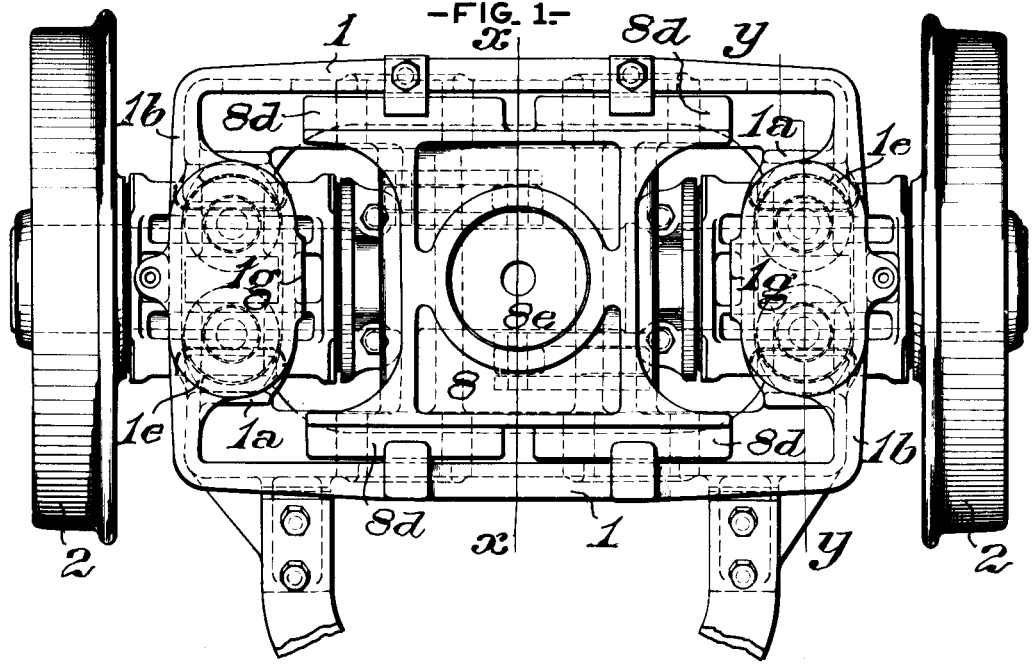
Figure 2:
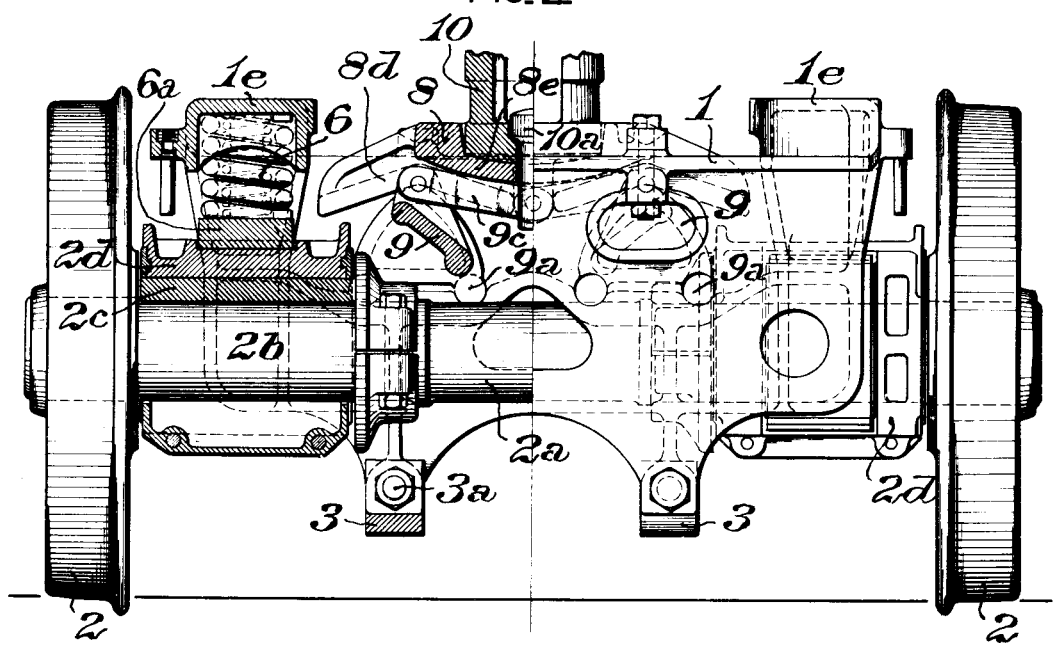

In the accompanying drawings: Figure 1 is a plan or top view of a locomotive truck embodying my invention; Fig. 2, a view, the left hand half of which is a vertical section, in the plane of the truck axle, and the right hand half, a front elevation, and; Figs. 3 and 4, vertical sections on the lines $x$ $x$ and $y$ $y$, respectively, of Fig. 1.

The conditions of modern railroad traffic have demanded a material increase in the power of locomotives, compliance with which demand has involved an increase in the number of coupled axles and a corresponding increase in the total length of the locomotive. By reason of this increase in length, the deflection of the front and rear ends of the locomotive from the central plane of the track, in traversing curves, is correspondingly increased, and the supporting trucks at the ends of the locomotive must therefore permit of a greater degree of lateral movement of the center pins than in those of the older types. With the ordinary construction of "three point hangers", as exemplified in the patent of H. F. Ball, No. 1,074,154, dated September 30, 1913, a lateral movement not exceeding about four inches is possible, with comparatively low resistance, and while, by the application of rockers, as in the construction set forth in the patent of W. E. Woodard, No. 1,060,222, dated April 29, 1913, any desired resistance is obtainable, the lateral movement is limited by reason of the form of the bolster and its relation to the end members of the frame, which limitation obtains, so far as my knowledge and information extend, in all trucks of the lateral motion type which have been heretofore designed.

My invention provides a locomotive truck which embodies the features of practical value presented in those above noted, together with that of a considerable increase in capacity of lateral motion.

Referring to the drawings, my invention is herein exemplified in a two wheeled lateral motion leading truck, adapted to support the front portions of the main frame of a locomotive engine and the weight which is carried thereon. The truck frame is an integral casting, which is substantially of box form, and comprises two parallel front and rear side members, 1, 1, extending transversely of the locomotive, and two parallel end members, $1^b$, $1^b$, connecting the side members. The side members are also connected by tie bars, 3, which are secured to lugs depending from the side members in planes on the inner sides of the pedestal jaws, by bolts, $3^a$, and nuts. A pair of pedestal jaws, $1^a$, $1^a$, extends inwardly from each of the end members, each of said jaws being connected with the side member, 1, which is nearer to it, by an upper horizontal rib, $1^c$, and a lower horizontal rib, $1^d$, both of which ribs are cast upon, and project inwardly from, the adjacent end member, $1^b$. A horizontal spring seat, $1^e$, extends across the top of each of the end members, and is connected with the upper ribs, $1^c$, of the pedestal jaws thereof, by substantially vertical ribs, $1^f$, which project inwardly from the end member.

It will be seen that by the above construction, the end frame members may be made of great strength without excessive weight, and that ample space is provided between the walls, $1^f$, for the reception of the springs through which weight borne by the frame is transmitted to the axle boxes.

The truck wheels, 2, are secured, in the usual manner, on the outer ends of the truck axle, $2^a$, the journals, $2^b$, of which, rotate in bearings, $2^c$, fitted in axle boxes, $2^d$, each of which is fitted between the members of one of the pairs of pedestal jaws, $1^a$. The truck frame is supported on the axle boxes through the intermediation of springs, 6, which are herein shown as of the helical type, a nest of said springs being located below each of the spring seats, 1ᵉ, and between the frame ribs, 1ᶠ, and bearing, at their upper ends, on the spring seat, and, at their lower ends, on an equalizer, 6ᵃ, which, in turn, bears centrally on the top of the axle box.

The capacity of lateral motion of the truck frame and its axle and wheels, relatively to the main frame of the locomotive, for the purpose of facilitating the passage of the locomotive to, through, and from curved portions of the track, is provided for by a swing beam or bolster, 8, which is located in the open space between the side and end members of the truck frame, and is supported on said frame, with the capacity of lateral motion relatively thereto, upon rockers, 9, which are of the construction set forth in the Woodard Patent No. 1,060,222 aforesaid, and which, not forming, in and of themselves, part of my present invention, will not be herein in detail described. The rockers, 9, are, as in said patent, curved upwardly and inwardly, on opposite sides, from their bases to their tops, and each is provided with two journals, 9ᵃ, fitting correspondingly recessed bearings in the side members, 1, 1, of the frame. The bolster, 8, bears on the curved bearing surfaces of the rockers, through double inclines, 8ᵈ, on its lower side, and the rockers are coupled, by links, 9ᶜ, to pins, 9ᵈ, fixed in the bolster, in the central transverse plane thereof.

The outer pairs of bearing inclines of the bolster, project, as shown in Fig. 1, from the corners thereof, and the bolster is recessed between them, so that, in its lateral movements, the inclines will pass entirely clear of the spring seats, 1ᵉ, and the entire distance between each end of the bolster and the adjacent spring seat will be available for the lateral movement of the bolster on one or the other side of the longitudinal central plane of the locomotive. Stops, 1ᵍ, are formed on the inner sides of the spring seats, against which the bottoms of the recessed ends of the bolster abut, at the limits of its lateral movement. A lower center bearing, 8ᵉ, which is formed on the top of the bolster, receives the upper center casting, 10, which is connected with the main frame of the locomotive, in the usual manner, and the upper and lower center castings are coupled by a center pin, 10ᵃ.

I claim as my invention and desire to secure by Letters Patent:

1. A frame for a lateral motion truck, comprising, in an integral structure, front and rear side members extending transversely to the longitudinal central plane of a locomotive and connected by shorter end members, pedestal jaws projecting inwardly from the end members, spring seats on the tops of the end members, upper and lower horizontal ribs on the end members, connecting the pedestal jaws with the side members, and substantially vertical ribs connecting the upper horizontal ribs with the spring seats.

2. A frame for a lateral motion truck, comprising, in an integral structure, front and rear side members extending transversely to the longitudinal central plane of a locomotive and connected by shorter end members, pedestal jaws projecting inwardly from the end members, spring seats formed on the end members, above the pedestal jaws, and stops on the inner sides of the spring seats for limiting the lateral traverse of the truck frame relatively to a fixed bolster.

3. In a lateral motion truck, the combination, with an integral truck frame comprising front and rear side members extending transversely to the longitudinal central plane of a locomotive, connecting end members having inwardly projecting pedestal jaws, and spring seats located above said jaws, of a bolster, supported, with the capacity of relative lateral movement, on the truck frame, and having recessed ends adapted to abut centrally against the inner sides of the spring seats.

4. In a lateral motion truck, the combination, with an integral truck frame, comprising front and rear side members extending transversely to the longitudinal central plane of a locomotive, connecting end members having inwardly projecting pedestal jaws and spring seats located above said jaws, of a bolster having inclined bearings projecting at opposite sides from its ends and spaced apart a distance greater than the length of the spring seats, and rockers journaled on the side members and abutting against the inclined bearings of the bolster.

5. In a lateral motion truck, the combination, with an integral truck frame comprising front and rear side members extending transversely to the longitudinal central plane of a locomotive, connecting end members having inwardly projecting pedestal jaws and spring seats located above said jaws, and having substantially vertical end ribs connecting them with the side and end members, of axle boxes fitted between the pedestal jaws, equalizers bearing on the axle boxes, and nests of helical springs fitted between the end ribs of the spring seats and bearing on said seats and on the equalizers.

HAL R. STAFFORD.

Witnesses:
J. SNOWDEN BELL,
A. S. FOWLER.

Copies of this patent may be obtained for five cents each, by addressing the "Commissioner of Patents, Washington, D. C."